United States Patent [19]
Fretwell

[11] 3,778,540
[45] Dec. 11, 1973

[54] AUTOMATIC ELECTRONIC HERE IS GENERATOR

[76] Inventor: Richard D. Fretwell, 1891 Willoway Cir. North, Columbus, Ohio 43220

[22] Filed: Apr. 20, 1972

[21] Appl. No.: 245,792

[52] U.S. Cl. .............................. 178/4.1 B, 331/135
[51] Int. Cl. .............................................. H04l 15/34
[58] Field of Search ................. 178/4.1 B; 179/2 DP

[56] References Cited

UNITED STATES PATENTS 3,531,772 9/1970 Dalyai et al. ....................... 178/41 B

*Primary Examiner*—Kathleen H. Claffy
*Assistant Examiner*—Kenneth Richardson
*Attorney*—Anthony D. Cennamo et al.

[57] ABSTRACT

A "here is" generator, for an automatic answering data terminal, which generates a WRU code and applies it to the terminal's answer-back mechanism. The generator has a square wave oscillator and a pair of timing circuits which initially free the oscillator for oscillation then clamp it in a mark output and finally clamp it in a steady state space output.

10 Claims, 4 Drawing Figures

FIG. 4

AUTOMATIC ELECTRONIC HERE IS GENERATOR

BACKGROUND OF THE INVENTION

This invention relates generally to automatic answering data terminals and more particularly relates to a circuit for automatically generating a WRU code.

In conventional manual Teletype operation, the operator of a local terminal which is being called by a remote terminal begins the answer transmission with a specific code which identifies the local terminal. This identifying code for each local terminal is recorded at the terminal on a mechanical drum or other memory storage device called the answer-back mechanism The conventional Teletype keyboard is provided with a "here is" key which is depressed by an operator at the beginning of a transmission and which thereupon initiates operation of or trips the answer-back mechanism which automatically transmits its recorded identifying code.

A typical local terminal is also provided with circuits and mechanism to permit a remote terminal to specifically request the identifying code of the local terminal. This is accomplished by first assigning to a particular code the unique function of tripping the answer-back mechanism of a local terminal. When the remote terminal transmits the WRU code, the answer-back mechanism of the local terminal is actuated. For example, the WRU code, meaning a "who are you" interrogation code may be 10101111000. Therefore, a local terminal is provided with detector logic circuitry which will recognize this code when received and upon recognition automatically trigger the local terminal's answer-back mechanism.

In designing a modem for use with a terminal which will automatically answer in response to a call from a remote terminal, it is necessary to provide a circuit which will automatically trip the answer-back mechanism of the local terminal immediately upon receipt of a call from a remote terminal. Such a circuit would not depend upon receipt of a WRU message although it would permit the usual response to such a message. Instead, it would initiate the answer-back mechanism at the beginning of each answer by a local terminal in response to a call from a remote terminal. Therefore, a circuit is needed which will respond to the appearance of a carrier from a remote terminal without the necessity of the transmission of the WRU code from the remote terminal.

SUMMARY OF THE INVENTION

The invention is an automatic "here is" generator which automatically generates the WRU code and applies it to the local terminal's WRU code detector logic circuitry immediately upon the detection of a received carrier by the local terminal. The circuit has a square pulse oscillator for generating alternative output levels corresponding to mark and space pulses and having a mark clamping input and a space clamping input. The output of this oscillator is the output of the "here is" generator. A first timing circuit means is provided for generating an output level shift for a selected first time interval in response to the appearance of a carrier from a remote terminal. A second timing circuit means is provided for generating an output level shift for a selected second time interval upon the appearance of a carrier from a remote terminal. The output of a second timing means is connected to the mark clamping input of the oscillator. An "exclusive or" gate means has its output connected to the space clamping input and has a pair of inputs each connected to the output of one of the timing circuit means for clamping the oscillator at a space output level when only one of the outputs of the timing circuit means is in its output level shifted condition.

Accordingly, it is an object of the invention to provide an improved automatic electronic "here is" generator.

Another object of the invention is to provide an automatic "here is" generator which can be connected to the standard or conventional Teletype terminal to provide automatic tripping of its answer-back mechanism without requiring modification of the conventional terminal.

Further objects and features of the invention will be apparent from the following specification and claims when considered in connection with the accompanying drawings illustrating the preferred embodiment of the invention.

Figure 1:
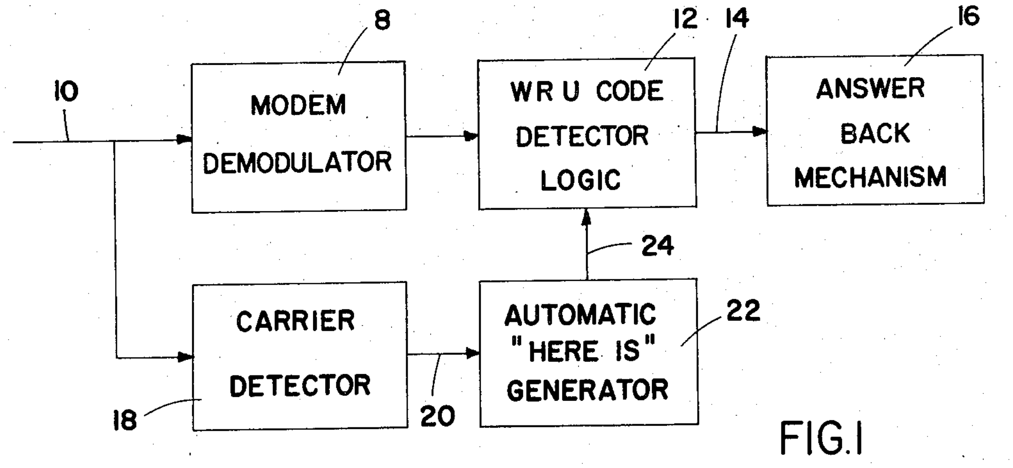
FIG. 1 is a block diagram illustrating a part of a data terminal and showing the connection of an embodiment of the invention in the data terminal circuit.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose. For example, the term connected is not limited to direct connection but includes connections through other electronic elements where such interposition of other electronic elements is well known and equivalent in the art.

DETAILED DESCRIPTION

FIG. 1 illustrates, in block diagram for, a portion of the circuitry present at a local data terminal. Additional terminal circuitry, which does not directly cooperate with the embodiment of the present invention, is not included therein. A modem demodulator 8 is provided for receiving frequency shift modulated data from a transmission line 10 and demodulating the data to a voltage level shifting form. A WRU code detector logic circuit 12 is connected to the demodulator 8 for receiving the data and for identifying the WRU code. When the detector 12 detects the transmission of a WRU code from a remote terminal, it trips through a connection 14, the answer-back mechanism 16. The answer-back mechanism is then operated to transmit its previously recorded identifying data and apply it to the modem modulator, not illustrated, for transmission to the remote terminal. The modem is also provided with a carrier detector 18 which shifts its output level at 20 upon the appearance of a carrier on the transmission line 10 from a remote terminal. The automatic "here is" generator 22 is connected to receive the output of the carrier detector 18 and to begin operation upon the receipt of a carrier. In response to the carrier-indicating voltage level shift at its input 20, the "here is" generator 22 applies a WRU code at 24 to the WRU code detector logic ciruict 12.

Therefore, it becomes apparent that the answer-back mechanism 16 of the conventional Teletype terminal may be actuated to transmit its recorded message in either of two ways. It may be actuated manually be depression of the "here is" key on the Teletype keyboard. Secondly, it may be actuated by the transmission of the WRU code from the remote terminal. By using a "here is" generator embodying the invention, the answer-back mechanism, may thirdly be actuated by the generation of the WRU code by the "here is" generator 22 upon the initial receipt of a carrier at the carrier detector 18.

Figure 3:
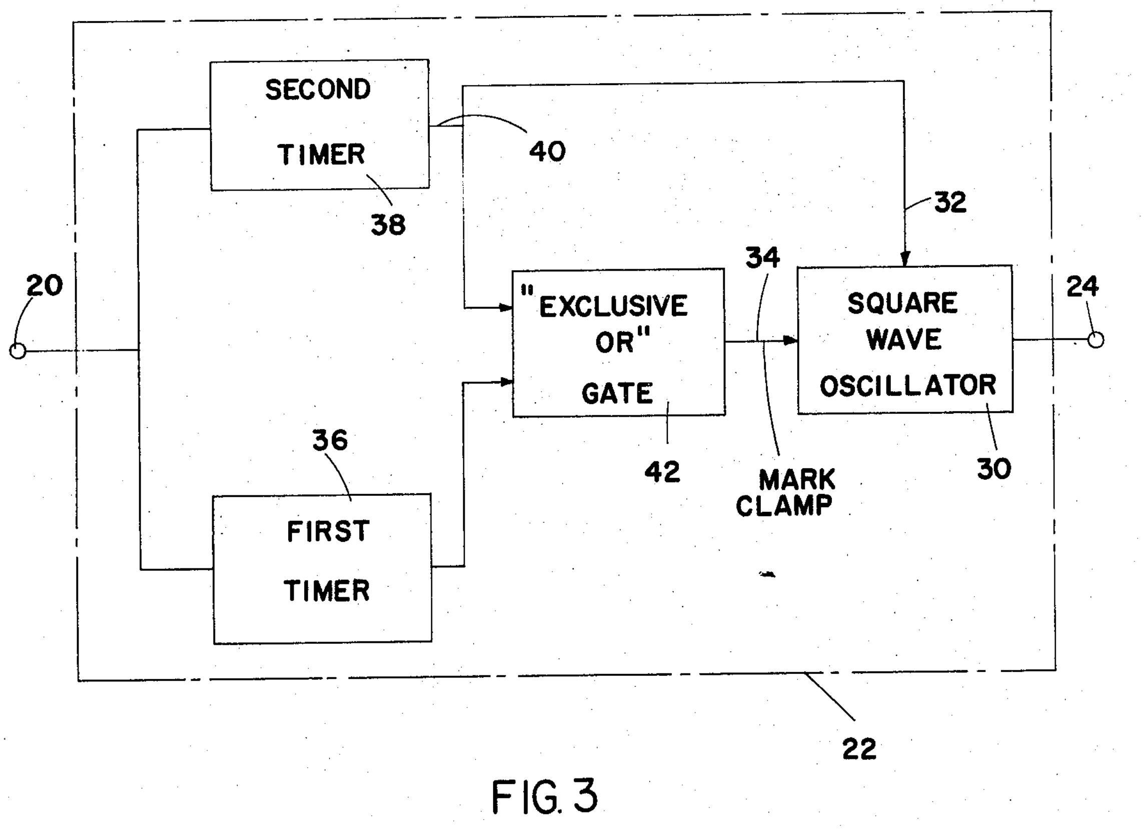
FIG. 3 is a block diagram illustrating the preferred embodiment of the invention.

The automatic "here is " generator 22 is illustrated in block diagram form in FIG. 3. The "here is" generator 22 has a square wave oscillator 30 the output of which is the output 24 of the "here is" generator. When permitted to oscillate freely, the oscillator 30 generates alternative output levels corresponding to mark and space pulses. The oscillator 30, however, is provided with a mark clamping input 32 and a space clamping input 34. Application of the suitable voltage at the clamping inputs 32 and 34 will clamp the oscillator in either the mark output level or the space output level respectively. The absence of such suitable input voltages at the inputs 32 and 34 will free the oscillator 30 for oscillation.

A first timing circuit 36 is provided having its input connected to the "here is" generator input 20. This first timing circuit 36 generates an output level shift for a selected time interval in response to a carrier-indicating level shift at the input 20.

A second timing circuit means 38 is similarly provided having its input connected to the input 20 of the "here is" generator. This second timing circuit means 38 generates an output level shift for a selected second time interval in response to a carrier-indicating level shift at the input 20. The output 40 of the second timing circuit means is connected to the space clamping input 32 of the oscillator 30.

An "exclusive or" gate means 42 is provided having its output connected to the space clamp input 34 of the square wave oscillator 30. The gate means 42 has a pair of inputs each connected to the output of one of the timing circuit means 36 and 38. The "exclusive or" gate 42 clamps the oscillator at a space output level when only one of the timing circuits means outputs is in its output level shift condition. That is, the "exclusive or" gate clamps the oscillator in a space output when only one but not both of the two timing circuit means has timed out.

Figure 2:
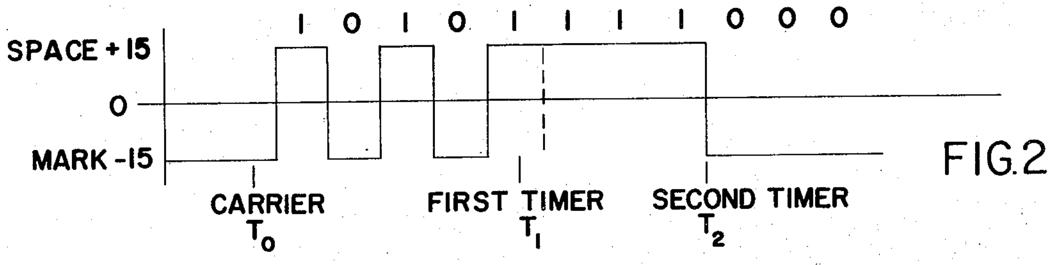
FIG. 2 is a graphic diagram illustrating the WRU code and the operation of the preferred embodiment of the invention.

FIG. 2 illustrates the general operation of the embodiment illustrated in FIG. 3. The wave form of FIG. 2 represents the output on the "here is" generator 22 at its output terminal 24. Prior to the transmission of the carrier from a remote terminal at time $t_o$, the output 24 is clamped at an output level corresponding to a mark. The second timer 38 clamps the oscillator to its mark output through the clamping input 32. The "exclusive or" gate 42 is not clamping the oscillator because neither timing circuit has begun its timing cycle.

Upon receipt of a carrier-indicating level shift at the input 20, the first and second timing means 36 and 38 shift their output levels and maintain this shifted condition, each for a different selected time interval. Upon receipt of the carrier at time $t_o$, the shift in the level of the second timer frees and unclamps the oscillator from its mark condition. The "exclusive or" gate output at 34 remains the same and does not clamp because both timers have shifted levels. Thus, initially, the square wave oscillator is freed for oscillation. It continues oscillating until the first timer times out at time $t_1$ an returns the timers output level to its initial condition. During this time interval, the square wave oscillator will oscillate as shown in the time interval $t_o$ to $t_1$, send the bits 1010, and then return to 1.

The first timing means 36 then times out during this fifth bit at the time $t_1$. Because one timer, but not both has now timed out, the "exclusive or" gate shifts it output level at the mark clamping input 34 and clamps the oscillator 30 in a mark output condition. The socillator 30 will remain clamped in the space output condition until the second timer times out at the time $t_2$. This second time interval is designed to end eight pulses subsequent to the initial occurrence and detection of the carrier at time $t_o$. Therefore, the oscillator is maintained clamped in the space condition for transmitting four space bits from $t_1$ to $t_2$. The second timer then times out at $t_2$ and returns to its initial state thereby switching the output of the "exclusive or" gate 42 and clamping the square wave oscillator in a mark output.

Figure 4:
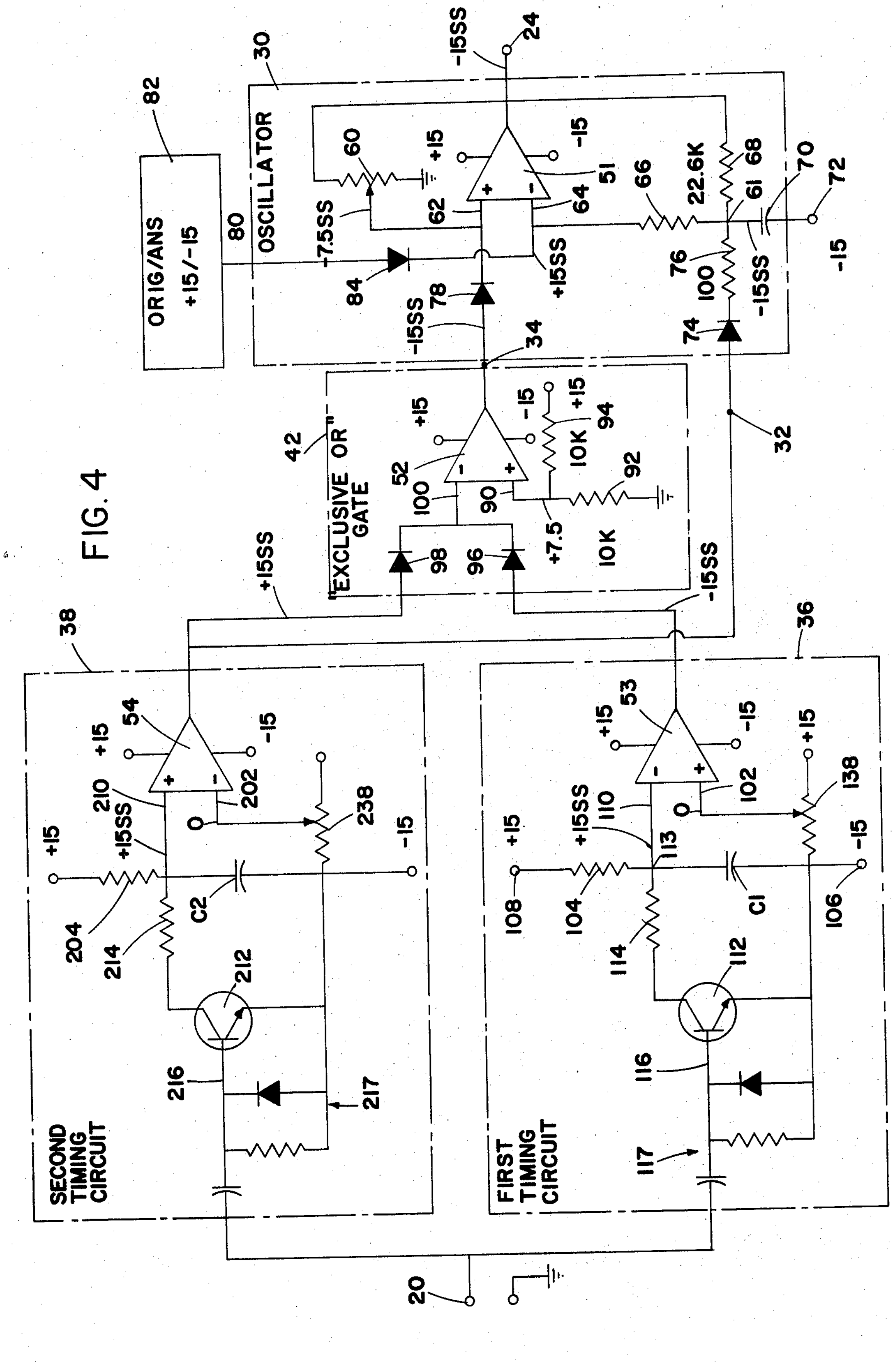
FIG. 4 is a schematic diagram of the preferred embodiment of the invention.

FIG. 4 illustrates the schematic diagram of the preferred embodiment of the invention. To aid in explanation, the voltage levels at various points on the circuit are indicated. They are followed by letters SS when they indicate the voltage level at the steady state which changes during operation.

The oscillator 30 has a high gain differential comparator 51 as an active element. A potentiometer 60 operating as a voltage divider network is connected between the output 24 of the comparator 51, the non-inverting input 62 of the comparator 51 and ground to apply a proportion of the output signal to the non-inverting input 62. As illustrated, the potentiometer may be preferably be adjusted to a 50% setting to apply a −7.5 volt to the non-inverting input 62 when the output is at a −15 volt level.

A second feedback network is provided for applying a voltage to the inverting input 64 of the comparator 51. This second feedback network comprises a pair of resistances 66 and 68 which are connected between the output 24 and the inverting input 64 of the comparator 51. A capacitance 70 is connected between the common node of the resistances 66 and 68 and a dc source 72. A diode 74 and resistance 76 connect the mark clamping input 32 to this common node 61. Another diode 78 connects the space clamping input 34 to the non-inverting input 61 of the comparator 51.

Because the automatic "here is" circuit is intended to operate only when the local terminal is in an automatic answer mode, an input is provided at 80 to prevent its operation when the modem is in its originate mode. A +15 volts applied at the input 80 clamps the oscillator and prevents operation regardless of what occurs in the remainder of the "here is" generator circuitry. However, when the mode, is switched to an answer mode, a −15 volts is applied to the diode 84 and consequently effectively disconnects the originate/answer indicating circuitry 82 from the "here is" generator circuit so that is will have no effect.

The "exclusive or" gate means 42 has a second high gain differential comparator 52 with its non-inverting input 90 biased by the voltage dividing resistances 92 and 94 to a selected voltage level such as +7.5 volts. A pair of diodes 96 and 98 have their cathodes connected to the inverting input 100 of the comparator 52 and their cathodes are connected to different ones of the outputs of the timing circuit means 36 and 38.

The first timing circuit means 36 comprises a differential comparator 53 having its non-inverting input 102 biased to a selected voltage level such as, for example, 0 volts by a potentiometer 138. A serially connected first timing capacitance $C_1$, first charging resistance 104 and first dc source applied at terminals 106 and 108 have the comparator inverting input 110 connected to their node 113 intermediate the first resistance 104 and the capacitance $C_1$.

A circuit is additionally provided for at times discharging capacitance $C_1$. This capacitance discharge circuit comprises a series first transistor switch 112 and discharge resistance 114 which are connected parallel to the capacitance $C_1$. The transistor switch 112 has a control input terminal 116 at its base and operates to discharge the capacitance $C_1$ when a pulse appears at its input terminal 116. A differentiator circuit 117 is connected between the "here is" circuit input terminal 20 and the control input 116 of the transistor switch 112. Its purpose is to differentiate the square leading edge of the level shift at the input 20 due to the appearance of a carrier at the carrier detector 18 of FIG. 1.

The second timing circuit means 38 is substantially identical to the first timing circuit means 36. Corresponding numerals are used to indicate corresponding parts. However, the second timing circuit means 38 differs in two important respects. The time constant provided by the capacitance $C_2$ and the resistance 204 is longer than the time constant provided by the capacitance $C_1$ and the resistance 104. Additionally, the second timing circuit means 38 utilizes a high gain, differential comparator 54 wherein the inverting and non-inverting inputs 202 and 210 are interchanged from the manner of connection of the corresponding inputs of the comparator 53.

The operation of the preferred embodiment illustrated in FIG. 4 can be considered by initially considering its steady state condition. With no carrier present, there will be no input pulses at the inputs 116 and 216 to the transistor switches 112 and 212. Their bases will be effectively connected to their emitters and consequently, the transistor switches 112 and 212 will be non-conducting. Utilizing the power sources of magnitudes indicated in the drawing, the capacitors $C_2$ and $C_1$ each will charge to a total of 30 volts. Therefore, the inverting input 110 of the comparator 53 will be at a +15 volt level and similarly the non-inverting input 210 of the comparator 54 will be at a +15 volt level. The potentiometers 138 and 238 may be adjusted so that the voltage level at the non-inverting input 102 of the comparator 53 and the voltage input of the inverting input 202 of the comparator 54 are both at 0 volts. In this condition, the output of the comparator 54 will be at a +15 volt level.

The non-inverting input 90 of the comparator 52 in the "exclusive or" gate 42 will be biased to approximately +7.5 volts by the equal resistances 92 and 94 connected between ground and a +15 volts supply. The inverting input 100 of the comparator 52 will be held at +15 volts by the forward biased diode 98. With the comparator 52 having these input conditions, the output of the comparator 52 will be at a −15 volts.

The −15 volt output of the comparator 52, which is applied through the space clamping input 34 to the diode 78 will reverse bias the diode 78 thus effectively disconnecting the "exclusive or" gate 42 from the oscillator circuit 30.

The originate/ answer control circuitry 82 will have a −15 volt output at the input terminal 80 so that the diode 84 is reverse biased effectively disconnecting the circuitry 82 from the oscillator 30.

The diode 74 which is connected to the mark clamping input 32 will be forward biased and therefore the resistances 68 and 76 will form a voltage divider between the +15 volt level at the output of the comparator 54 of the second timing circuit 38 and the output 24 of the comparator 51. Assuming that the output of the comparator 51 is at a −15 volt level, the node 61 will therefore be at approximately a +15 volt level because of the relative resistance of the resistances 78 and 76. Therefore, the inverting input 64 of the comparator 51 will be at a +15 volt level. The potentiometer 60 may be adjusted so that the non-inverting input 72 of the comparator 51 will be a −7.5 volts. It can be seen that the presence of a +15 volt level at the inverting input 64 and a −7.5 volt level at the non-inverting input 62 is consistent with the presence of a −15 volt level at the output of the high gain differential comparator 51. The above description of the operation therefore describes the steady state condition of the circuitry as it awaits the occurrence of a carrier.

If a carrier now occurs, for example, at the time $t_0$ as illustrated in FIG. 2, a level shift will occur at the input 20. The differentiator of each timing circuit means 36 and 38 will differentiate the leading edge of this level change and apply a spike to the inputs 116 and 216 of the transistor switches 112 and 212. These transistor switches will therefore conduct and discharge the capacitances $C_1$ and $C_2$. Discharge of the capacitance $C_1$ causes the inverting input 110 of the comparator 53 to shift from its steady state +15 volts to the −15 volt level from the power supply input 106. This change in input to the comparator 53 causes its output level to shift from its steady state −15 volts to a +15 volt level.

For the same reasons, the output of the comparator 54 in the second timing circuit means 38 will likewise shift from its steady state +15 volt level to a −15 volt level. However, the diode 96 will now become forward biased as the diode 98 becomes reverse biased and therefore the inverting input 100 of the comparator 52 will remain at a +15 volt level. This means that the −15 volt steady state level applied at the space clamping terminal 34 will remain the same and maintain the "exclusive or" gate 42 effectively disconnected from the oscillator 30.

However, the shifting of the output of the comparator 54 from a +15 volt steady state level to a −15 volts level reverse biases the diode 74 connected to the mark clamping input terminal 32. This reverse biasing of the diode 74 effectively disconnects the timing circuit 38 from the oscillator 30 freeing the oscillator for oscillation.

The capacitor 70 in the oscillator 30 which had charged to 30 volts so that the node 61 was at a steady state +15 volts, now begins to discharge. Thus, the node 61 moves from a +15 volt level toward a −15 volt level. When the node 61 passes the −7.5 volt level and becomes more negative than −7.5 volts, the output of the comparator 51 will then shift from its steady state −15 volts to a +15 volt output. This will be a shift from a mark output to a space output level thus sending a one for the beginning of the WRU code.

When the output of the comparator 51 switches from its steady state −15 volt level to the +15 volt level as stated above, the non-inverting input 62 will have a +7.5 volt level immediately applied thereto. The occurrence of the +15 volts at the output of the comparator 51 will cause the node 61 to reverse its direction of discharge and begin charging toward a +15 volt level. When the node 61 becomes more positive than +7.5 volts, the output of the comparator 51 will again shift and return to a −15 volt level. The cycle will then be repeated so long as diodes 74 and 78 remain reverse biased.

This oscillatory switching will continue until the first timing means 36 times out. This will occur when the timing capacitance $C_1$ has charged sufficiently that the inverting input 110 of the comparator 53 has returned from a −15 volt level to a +15 volt level. When this inverting input 110 returns to the positive voltage level, the output of the comparator 53 will again return to its steady state −15 volts. However, the output of the comparator 54 in the second timing means 38 is still at its −15 volt output level because the second timing means has not yet timed out.

Therefore, now both diodes 96 and 98 become reversed biased so that both timing means 36 and 38 become disconnected from the inverting input 100 of the comparator 52 in the "exclusive or" gate 42. Therefore, the output of the "exllusive or" gate 42 at the output of the comparator 52 will now switch from its −15 volts steady state level to a +15 volt level. This switching will forward bias the diode 78 and thereby apply a +15 volt level to the non-inverting input 62 of the oscillator comparator 51. The oscillator will therefore be clamped in a space state because the +15 volt level at the non-inverting input 62 will cause a +15 volt level at the output 24 of the comparator 51.

The first timing means 36 is designed by choosing values of capacitance $C_1$ and resistance 104 and by adjusting the position of the pot 138 so that the output level of the first timing means 36 will switch during the occurrence of the third space pulse at time $t_1$. The pot 138 may be adjusted to time out at any time during the third space pulse but preferably is adjusted to time out around the center of the third space pulse. Such timing design will permit the oscillator to be clamped in the space output condition after the initial 1010 bits of the WRU code are generated.

The oscillator 30 continues clamped in its space output condition until the second timing means 38 times out. Thus, when the capacitance $C_2$ has changed sufficiently that the non-inverting input 210 of the comparator 54 has gone to a positive voltage, the output of the comparator 54 will again return to a steady state +15 volt level. This will again forward bias the diode 98 causing the output of the comparator 52 to return to its −15 volt level. This in turn, means that the oscillator will no longer be clamped in the space conditon.

Additionally, switching of the output of the comparator 54 to its steady state +15 volt level will forward bias the diode 74 and thereby clamp the oscillator in its mark condition for reasons described above to return the entire circuit to its steady state condition.

Therefore, it can be seen that I have provided an entirely automatic "here is" generator which generates the WRU code electronically. An important advantageous result is that the preferred embodiment of the invention may be connected to existing Teletype terminals and avoids modification of the conventional Teletype terminal. The preferred embodiment of the invention permits use of an already available WRU code detector in the conventional Teletype for the "here is" function.

It is to be understood that while the detailed drawings and specific example given describe the preferred embodiment of the invention, they are for the purposes of illustration only, that the apparatus of the invention is not limited to the precise details and conditions disclosed and that various changes may be made therein without departing from the spirit of the invention which is defined by the following claims.

I claim:

1. A "here is" generator apparatus for generating a WRU code at its output in response to a pulse at its input, comprising:

a. a square pulse oscillator for generating alternative output levels corresponding to mark and space pulses and having a mark clamping input and a space clamping input, the output of said oscillator being the output of said apparatus;

b. a first timing circuit means having its input connected to the apparatus input for generating an output level shift for a selected first time interval;

c. a second timing circuit means having it input connected to the apparatus input for generating an output level shift for a selected second time interval, the output of said second timing means connected to said mark clamping input for clamping the oscillator at a mark output except during said second time period; and d. an "exclusive or" gate means having its output connected to said space clamping input and a pair of inputs each connected to the output of one of said timing circuit means for clamping said oscillator at a space output level when only one of the timing circuit means outputs is in its said output level shifted condition.

2. An apparatus according to claim 1 wherein said first time interval is more than four and less than five pulse lengths in duration and said second time interval is eight pulse lengths in duration.

3. An apparatus according to claim 2 wherein said apparatus input is connected to the output of a modem carrier detector and said apparatus output is connected to an input of a modem WRU code detector logic circuit.

4. An apparatus according to claim 3 wherein one of said timing circuit means comprises:

a. a high gain differential comparator having one of its inputs adjustably biased to a selected voltage level;

b. a serially connected timing capacitance, charging resistance and dc source having the other comparator input connected to the node intermediate said resistance and said capacitance;

c. a capacitance discharge circuit comprising a series transistor switch and discharge resistance connected parallel to said capacitance and having a control input terminal for discharging said capacitance in response to a pulse at said control input; and d. a differentiator circuit connected between said apparatus input and said control input for differentiating a square pulse and applying the differentiated pulse to said transistor switch.

5. An apparatus according to claim 3 wherein said "exclusive or" gate means comprises:

a. a high gain differential comparator having one of its inputs biased to a selected voltage level; and b. a pair of diodes each connected between the other comparator input and the output of one of said timing circuit means.

6. An apparatus according to claim 3 wherein said oscillator comprises:

a. a first high gain differential comparator having an inverting input, a non-inverting input and an output;

b. a first voltage divider feedback network connected to said output, to a common ground and to said non-inverting input for applying a proportion of the signal at said output to said non-inverting input;

c. a second feedback network including a series connected pair of resistances connected between said output and said inverting input, and a capacitance connected between the common node of said resistance pair and a dc source;

d. a first diode having its cathode connected to said common node and its anode connected to said mark clamping input; and e. a second diode having its cathode connected to said non-inverting input and its anode connected said space clamping input.

7. An apparatus according to claim 6 wherein said "exclusive or" gate means comprises:

a. a second high gain differential comparator having its non-inverting input biased to a selected voltage level; and b. a pair of diodes having their cathodes connected to the inverting input of said comparator and each of their cathodes connected to a different one of said timing circuit means.

8. An apparatus according to claim 7 wherein said first timing circuit means comprises:

a. a third high gain differential comparator having its non-inverting input biased to a selected voltage level;

b. a serially connected first timing capacitance, first charging resistance and first dc source, having the comparator inverting input connected to the node intermediate said first resistance and said first capacitance;

c. a capacitance discharge circuit comprising a series first transistor switch and first discharge resistance connected parallel to said first capacitance and having a first control input terminal for discharging said capacitance in response to a pulse at said first control input; and d. a first differentiator circuit connected between said apparatus input and said first control input for differentiating a square pulse and applying the differentiated pulse to said first transistor switch.

9. An apparatus according to claim 8 wherein said second timing circuit means comprises:

a. a fourth high gain differential comparator having its non-inverting input biased to a selected voltage level;

b. a serially connected second timing capacitance, second charging resistance and second dc source, having said fourth comparator's inverting input connected to the node intermediate said second resistance and said second capacitance;

c. a capacitance discharge circuit comprising a series second transistor switch and second discharge resistance connected parallel to said second timing capacitance and having a second control input terminal for discharging said second timing capacitance in response to a pulse at said second control input; and d. a second differentiator circuit connected between said apparatus input and said second control input for differentiating a square pulse and applying the differentiated pulse to said second transistor switch.

10. An apparatus according to claim 1 further including means for activating the answer back mechanism of a Teletype terminal, the terminal having a WRU code detector for activating the answer back mechanism in response to the occurrence of the WRU code at its input, the apparatus comprising:

a. said means a carrier detector means for shifting its output level in response to the receipt of a carrier from a remote terminal; and b. a WRU code generating circuit means connected to the output of said carrier detector means for generating a WRU code in response to said level shift and having its output connected to an input to said WRU code detector.

* * * * *